3,395,009
STUNTING AGENTS
Heinz Oettel, Harald Frohberg, and Karl-Heinz Koenig, Ludwigshafen (Rhine), Germany, assignors to Badische Anilin- & Soda-Fabrik Aktiengesellschaft, Ludwigshafen (Rhine), Germany
No Drawing. Filed Mar. 9, 1965, Ser. No. 438,381
Claims priority, application Germany, Mar. 13, 1964, B 75,896
5 Claims. (Cl. 71—76)

ABSTRACT OF THE DISCLOSURE

A composition for regulating plant growth comprising a mixture of (A) a chlorocholine salt and (B) a choline salt in a molar ratio of (A):(B) of 1:0.5 to 1:20. The mixture has reduced toxicity for mammals while retaining the desirable plant growth regulating properties of the chlorocholine salt.

---

The present invention relates to mixtures of chlorocholine salts with choline salts. In particular it relates to mixtures of chlorocholine chloride [N-(2-chloroethyl)-trimethylammonium chloride] with choline chloride [N-($\beta$-hydroxyethyl)-trimethylammonium chloride]. These mixtures have a shortening effect on the growth of plants, increase the stem diameter, increase the stem wall thickness and consequently lessen the lodging of certain types of grain, for example wheat. Also, the mixtures of chlorocholine salts with choline salts have only slight toxicity toward warm-blooded animals The mixtures may therefore be used without risk in agricultural practice. If a small amount of the mixture should be absorbed, after use, in the human or animal body, substantially no hazards are involved because the mixtures are far less toxic than the pure active substance.

It is known that chlorocholine chloride (CCC) has been used for plant regulation (U.S. patent specification No. 3,156,554). It has the disadvantage however that it is relatively toxic.

We have now found that mixtures which contain a chlorocholine salt and a choline salt have only slight toxicity. The toxicity of chlorocholine salts for mammals is thus greatly lessened by being mixed with choline salts.

Mixtures which contain the chlorocholine salts and choline salts in the molar ratio of 1:0.05 to 1:20, in particular from 1:0.1 to 1:11, exhibit particularly low toxicity. The partial or total suppression toxicity is not a dilution effect because adding the same amount of an inert substance, for example sugar, instead of choline salts has no effect at all on the toxicity.

Choline and chlorocholine salts include quite generally acid, neutral or basic reacting salts of choline or chlorocholine with inorganic or organic acids. Examples of such acids are hydrochloric acid, sulfuric acid, phosphoric acid, nitric acid, carbonic acid, acetic acid, lactic acid, citric acid, ascorbic acid, propionic acid, acrylic acid, benzoic acid, fumaric acid, maleic acid, adipic acid, glutaric acid, succinic acid and phthalic acid. The action of the chlorocholine salts and choline salts is occasioned by the cations which are responsible for this action. The choice of the anions (acid radicals) may therefore be within a wide range and the action of the salts is not decisively affected by the different anions. It is also possible to mix salts having different anions. For example chlorocholine chloride may be mixed with choline sulfate, or chlorocholine acetate with choline chloride, or chlorocholine acetate with choline sulfate, or chlorocholine acetate with choline citrate. It has been found that mixtures which contain chlorocholine salts and choline salts in molar ratios of 1:0.2 to 1:2.3 have a particularly good compatibility for mammals, so that lethal doses of chlorocholine salts can be tolerated without symptoms of poisoning after choline salts have been added in the specified molar ratios.

Mixtures according to this invention may be in solid form or in liquid form, for example as aqueous solutions. In every case a greatly decreased toxicity of the chlorocholine salts, or a complete suppression of the toxicity in quite specific doses is observed.

The mixtures according to this invention, when used in agriculture, exhibit the same actions on plants as the unmixed chlorocholine salts, provided the same amount of active substance is used per unit of area.

The following examples illustrate the advantageous properties of the mixtures according to this invention. The abbreviation "CCC" is hereinafter used for chlorocholine chloride.

EXAMPLE 1

Mice.—Peroral toxicity

To determine the mean lethal dose ($LD_{50}$), CCC, mixtures of CCC and glucose, mixtures of CCC and choline base (neutralized with HCl), mixtures of CCC and chloline chloride, mixtures of CCC and dicholine sulfate, mixtures of CCC and choline acetate and mixtures of CCC and tricholine citrate are administered to mice weighing 18 to 22 g. (bred by NMRI-Tübingen) in doses (with reference to CCC) of 250, 320, 400, 500, 640 800 and 1,000 mg./kg. as aqueous solutions with a tube. The number of animals used per dose is ten male and ten female mice (observation period, seven days).

In the following table, mole=ratio of CCC and additive in moles in the mixture, and mg./kg.=seven days $LD_{50}$ in mg./kg. with reference to CCC.

TABLE.— CCC-$LD_{50}$ IN MG./KG. MOUSE

| Ratio of CCC:additive in parts by weight | 1:0.0 | 1:0.1 | 1:0.2 | 1:0.4 | 1:1.0 | 1:2.0 |
|---|---|---|---|---|---|---|
| CCC plus glucose | | | | | | |
| Mole | 1:0.0 | 1:0.088 | 1:0.176 | 1:0.352 | 1:0.883 | 1:1.766 |
| Mg./kg. | 405 | 410 | 405 | 400 | 395 | 405 |
| CCC plus choline base (neutralized with HCl): | | | | | | |
| Mole | 1:0.0 | | 1:0.228 | 1:0.454 | 1:1.14 | 1:2.28 |
| Mg./kg. | 405 | | 470 | 580 | 650 | 650 |
| CCC plus choline chloride: | | | | | | |
| Mole | 1:0.0 | 1:0.114 | 1:0.228 | 1:0.454 | 1:1.14 | 1:2.28 |
| Mg./kg. | 405 | 450 | 500 | 610 | 630 | 660 |
| CCC plus dicholine sulfate: | | | | | | |
| Mole | 1:0.0 | | | 1:0.234 | 1:0.584 | 1:1.17 |
| Mg./kg. | 405 | | | 505 | 600 | 630 |
| CCC plus choline acetate: | | | | | | |
| Mole | 1:0.0 | 1:0.0975 | 1:0.195 | 1:0.39 | 1:0.975 | 1:1.95 |
| Mg./kg. | 405 | 440 | 505 | 590 | 640 | 655 |
| CCC plus tricholine citrate: | | | | | | |
| Mole | 1:0.0 | | | 1:0.127 | 1:0.317 | 1:0.634 |
| Mg./kg. | 405 | | | 510 | 580 | 600 |

The same diminution in the toxicity is shown with dichlorocholine sulfate, chlorocholine acetate, trichlorocholine citrate and trichlorocholine phosphate mixed with dicholine sulfate, choline acetate, tricholine citrate or tricholine phosphate.

The salts used for the experiment are salts which give solutions in water having an about neutral reaction. For example dicholine sulfate is the sulfate of 2 moles of choline and 1 mole of sulfuric acid, and tricholine citrate is the citrate of 3 moles of choline and 1 mole of citric acid.

The $LD_{50}$ values given relate in each case merely to the content of CCC, i.e., for example that at a $LD_{50}=630$ mg./kg. with a ratio in parts by weight of CCC to choline chloride of 1:1, 50% of the animals die when they receive 1,260 mg./kg. of the mixture per kg. of body weight. 1,260 mg. of the mixture contains 630 mg. of CCC. Therefore the $LD_{50}$ value is given as 630 mg./kg.

From the numerical values it will be seen that when mixed with choline base (neutralized with HCl), with choline chloride, with dicholine sulfate, with choline acetate and the tricholine citrate, larger amounts of CCC are tolerated by the animals without symptoms of poisoning occurring. Such an effect is not obtained with mixtures of CCC and glucose (grape sugar), i.e., no matter to what extent CCC is diluted by admixture with glucose, the animals are poisoned in the same way as if they receive about the same amount of CCC.

EXAMPLE 2

Rats.—Peroral toxicity

To determine the mean lethal dose ($LD_{50}$), rats weighing 120 to 180 g. (bred by Sprague Dawley) have administered to them in the way described in Example 1, (a) CCC, (b) mixtures of CCC and glucose, (c) mixtures of CCC and choline base (neutralized with HCl), (d) mixtures of CCC and choline chloride, (e) mixtures of CCC and dicholine sulfate, (f) mixtures of CCC and choline acetate and (g) mixtures of CCC and tricholine citrate. Observation period, seven days. Mole and mg./kg. have the same meanings as in the table above.

TABLE.—CCC-$LD_{50}$ IN MG./KG. RATS

| Ratio of CCC:additive in parts by weight | 1:0.0 | 1:0.2 | 1:0.4 | 1:0.8 | 1:1.0 |
|---|---|---|---|---|---|
| (b): | | | | | |
| Mole | 1:0.0 | 1:0.176 | 1:0.352 | 1:0.704 | 1:0.883 |
| Mg./kg | 433 | 435 | 425 | 430 | 435 |
| (c): | | | | | |
| Mole | 1:0.0 | 1:0.228 | 1:0.454 | 1:0.908 | 1:1.14 |
| Mg./kg | 433 | 530 | 600 | 750 | 800 |
| (d): | | | | | |
| Mole | 1:0.0 | 1:0.228 | 1:0.454 | 1:0.908 | 1:1.14 |
| Mg./kg | 433 | 550 | 640 | 880 | 800 |
| (e): | | | | | |
| Mole | 1:0.0 | | 1:0.234 | 1:0.468 | 1:0.584 |
| Mg./kg | 433 | | 560 | 580 | 700 |
| (f): | | | | | |
| Mole | 1:0.0 | 1:0.195 | 1:0.39 | 1:0.78 | 1:0.975 |
| Mg./kg | 433 | 525 | 540 | 640 | 850 |
| (g): | | | | | |
| Mole | 1:0.0 | | 1:0.127 | 1:0.254 | 1:0.317 |
| Mg./kg | 433 | | 520 | 650 | 800 |

The same diminution in toxicity is shown by dichlorocholine sulfate, chlorocholine acetate, trichlorocholine citrate and trichlorocholine phosphate mixed with dicholine sulfate, choline acetate, tricholine citrate or tricholine phosphate.

EXAMPLE 3

Rabbits.—Peroral toxicity

To determine the mean lethal dose ($LD_{50}$), rabbits weighing 2 to 3 kg. have administered to them in the way described in Example 1, (a) CCC, (b) mixtures of CCC and glucose, (c) mixtures of CCC and choline chloride, (d) mixtures of CCC and dicholine sulfate, (e) mixtures of CCC and choline acetate and (f) mixtures of CCC and tricholine citrate. Usually six rabbits (three male and three female animals) are used per dose. Observation period, seven days. Mole and mg./kg. in the table have the same meanings as in the tables above.

TABLE.—CCC-$LD_{50}$ IN MG./KG. OF RABBIT

| Ratio of CCC:additive in parts by weight | 1:0.0 | 1:0.4 | 1:1.0 |
|---|---|---|---|
| (b): | | | |
| Mole | 1:0.0 | 1:0.352 | 1:0.883 |
| Mg./kg | 75 | 70 | 68 |
| (c): | | | |
| Mole | 1:0.0 | 1:0.454 | 1:1.14 |
| Mg./kg | 75 | 310 | 365 |
| (d): | | | |
| Mole | 1:0.0 | 1:0.234 | 1:0.584 |
| Mg./kg | 75 | 280 | 320 |
| (e): | | | |
| Mole | 1:0.0 | 1:0.39 | 1:0.975 |
| Mg./kg | 75 | 320 | 360 |
| (f): | | | |
| Mole | 1:0.0 | 1:0.127 | 1:0.317 |
| Mg./kg | 75 | 270 | 330 |

The same diminution in toxicity is shown by dichlorocholine sulfate, chlorocholine acetate, trichlorocholine citrate and trichlorocholine phosphate mixed with dicholine sulfate, choline acetate, tricholine citrate or tricholine phosphate.

EXAMPLE 4

Guinea pigs.—Peroral toxicity

To determine the mean lethal does ($LD_{50}$) albino guinea pigs weighing about 500 g. have administered to them as described in Example 1, (a) CCC, (b) mixtures of CCC and glucose, (c) mixtures of CCC and choline chloride, (d) mixtures of CCC and choline base (neutralized with HCl) and (e) mixtures of CCC and choline acetate. In most cases the number of animals used per dose is five male and five female guinea pigs. Observation period, seven days.

TABLE.—CCC-$LD_{50}$ IN MG./KG. OF GUINEA PIGS

| Ration of CCC:additive in parts by weight | 1:0.0 | 1:1.0 | 1:2.0 |
|---|---|---|---|
| (b): | | | |
| Mole | 1:0.0 | 1:0.883 | 1:1.766 |
| Mg./kg | 210 | 195 | 200 |
| (c): | | | |
| Mole | 1:0.0 | 1:1.14 | 1:2.28 |
| Mg./kg | 210 | 440 | 460 |
| (d): | | | |
| Mole | 1:0.0 | 1:1.14 | 1:2.28 |
| Mg./kg | 210 | 450 | 440 |
| (e): | | | |
| Mole | 1:0.0 | 1:0.975 | 1:1.95 |
| Mg./kg | 210 | 420 | 450 |

The same diminution in toxicity is shown by dichlorocholine sulfate, chlorocholine acetate, trichlorocholine citrate and trichlorocholine phosphate mixed with dicholine sulfate, choline acetate, tricholine citrate and tricholine phosphate.

EXAMPLE 5

Cats.—Peroral toxicity

To determine the mean lethal dose ($LD_{50}$), cats weighing 2 to 3 kg. are treated in the way described in Example 1 with (a) CCC, (b) mixtures of CCC and glucose, (c) mixtures of CCC and choline chloride, (d) mixtures of CCC and dicholine sulfate, and (e) mixtures of CCC and choline acetate. The number of animals used per dose is usually four cats. Observation period, seven days.

TABLE.—CCC-$LD_{50}$ IN MG./KG. OF CATS

| Ratio of CCC:additive in parts by weight | 1:0.0 | 1:1.0 | 1:4.0 | 1:8.0 | 1:10.0 |
|---|---|---|---|---|---|
| (b): | | | | | |
| Mole | 1:0.0 | 1:0.883 | 1:3.52 | 1:7.04 | 1:8.83 |
| Mg./kg | 7.0 | 6.5 | 7.0 | 6.0 | 7.5 |
| (c): | | | | | |
| Mole | 1:0.0 | 1:1.14 | 1:4.56 | 1:9.12 | 1:11.4 |
| Mg./kg | 7.0 | 30.0 | 35.0 | 50 | >50 |
| (d): | | | | | |
| Mole | 1:0.0 | 1:0.584 | 1:2.34 | 1:4.68 | 1:5.84 |
| Mg./kg | 7.0 | 25.0 | 30.0 | | >50 |
| (e): | | | | | |
| Mole | 1:0.0 | 1:0.975 | 1:3.9 | | 1:9.75 |
| Mg./kg | 7.0 | 30.0 | 40.0 | | >50 |

The same diminution in toxicity is shown by dichlorocholine sulfate, chlorocholine acetate, trichlorocholine citrate and trichlorocholine phosphate mixed with dicholine sulfate, choline acetate, tricholine citarte or tricholine phosphate.

EXAMPLE 6

Guinea pigs.—Inhalation toxicity (1% spray)

A 1% aqueous solution of CCC (a) without additive, (b) with glucose and (c) with choline chloride is atomized with an atomizer for therapeutic aerosols (Dräger penicillin atomizer), the amounts of glucose and choline chloride being such that the weight ratio of CCC to glucose or choline chloride is 1:1, 1:2 or 1:3. The spray produced is passed through an inhalation chamber having a capacity of 400 liters in which test animals have been placed. Passage of air through the jets is 550 liters per hour and the duration of inhalation is four hours in each case. Observation period, seven days.

TABLE.—CCC INHALATION TOXICITY (1% SPRAY) FOR GUINEA PIGS

| Ratio of CCC:additive | | Substance | Ratio of killed animals: total number of animals |
|---|---|---|---|
| Parts by weight | Moles | | |
| 1:0.0 | 1:0.0 | (a) | 8:20 |
| 1:1.0 | 1:0.883 | (b) | 9:20 |
| 1:1.0 | 1:1.14 | (c) | 0:20 |
| 1:2.0 | 1:1.765 | (b) | 5:10 |
| 1:2.0 | 1:2.28 | (c) | 0:10 |
| 1:3.0 | 1:2.645 | (b) | 10:20 |
| 1:3.0 | 1:3.42 | (c) | 0:20 |

The same diminution in toxicity is shown by dichlorocholine sulfate, chlorocholine acetate, trichlorocholine citrate and trichlorocholine phosphate mixed with dicholine sulfate, choline acetate, trichlorocholine citrate or trichlorocholine phosphate.

EXAMPLE 7

Guinea pigs.—Inhalation toxicity (5% spray)

A 5% aqueous solution is tested analogously to the method described in Example 6. The inhalation period is three hours in each test. Observation period, seven days.

TABLE.—CCC INHALATION TOXICITY (5% SPRAY) FOR GUINEA PIGS

| Ratio of CCC:additive | | Substance | Ratio of killed animals: total number of animals |
|---|---|---|---|
| Parts by weight | Moles | | |
| 1:0.0 | 1:0.0 | (a) | 22:45 |
| 1:1.0 | 1:0.883 | (b) | 25:45 |
| 1:1.0 | 1:1.14 | (c) | 3:45 |
| 1:2.0 | 1:1.765 | (b) | 12:20 |
| 1:2.0 | 1:2.28 | (c) | 1:20 |

The same diminution in toxicity is shown by dichlorocholine sulfate, chlorocholine acetate, trichlorocholine citrate and trichlorocholine phosphate mixed with dicholine sulfate, choline acetate, trichlorocholine citrate or trichlorocholine phosphate.

EXAMPLE 8

Cats.—Inhalation toxicity (5% spray)

A 5% aqueous CCC solution is tested in a manner equivalent to that described in Example 6. The inhalation period is three hours in each test. Observation period, seven days.

TABLE.—CCC INHALATION TOXICITY (5% SPRAY) FOR CATS

| Ratio of CCC: additive | | Substance | Ratio of killed animals: total number of animals |
|---|---|---|---|
| Parts by weight | Moles | | |
| 1:0.0 | 1:0.0 | (a) | 5:6 |
| 1:1.0 | 1:0.883 | (b) | 6:6 |
| 1:1.0 | 1:1.14 | (c) | 0:6 |

The same diminution in toxicity is shown by dichlorocholine sulfate, chlorocholine acetate, trichlorocholine citrate and trichlorocholine phosphate mixed with dicholine sulfate, choline acetate, trichlorocholine citrate or trichlorocholine phosphate.

We claim:
1. A composition for controlling the relative stem growth of plants, having improved toxicological properties comprising a mixture of (A) a salt of chlorocholine and (B) a salt of choline in a molar ratio of (A):(B) of 1:0.05 to 1:20.
2. A composition as claimed in claim 1 wherein the molar ratio of (A):(B) is about 1:0.2 to 1:2.3.
3. A composition as claimed in claim 1 wherein (A) and (B) are at least one salt of the chlorocholine and choline, respectively, with an acid selected from the class consisting of hydrochloric acid, sulfuric acid, phosphoric acid, nitric acid, carbonic acid, acetic acid, lactic acid, citric acid, ascorbic acid, propionic acid, acrylic acid, benzoic acid, fumaric acid, maleic acid, adipic acid, glutaric acid, succinic acid and phthalic acid.
4. A composition as claimed in claim 1 wherein (A) is chlorocholine chloride and (B) is choline chloride.
5. A composition as claimed in claim 4 wherein the molar ratio of (A):(B) is about 1:0.2 to 1:2.3.

References Cited

UNITED STATES PATENTS 3,156,554   11/1964   Tolbert _____ 71—2.7

OTHER REFERENCES

Ravento's CA 32 (1938) p. 990.
Pharmazeutische Ind. et al. CA 24 (1926) p. 4589.

LEWIS GOTTS, *Primary Examiner.*

G. HOLLRAH, *Assistant Examiner.*